(No Model.)
G. W. BUGBEE & F. DANNER.
COUNTER SHAFT.
No. 384,560. Patented June 12, 1888.
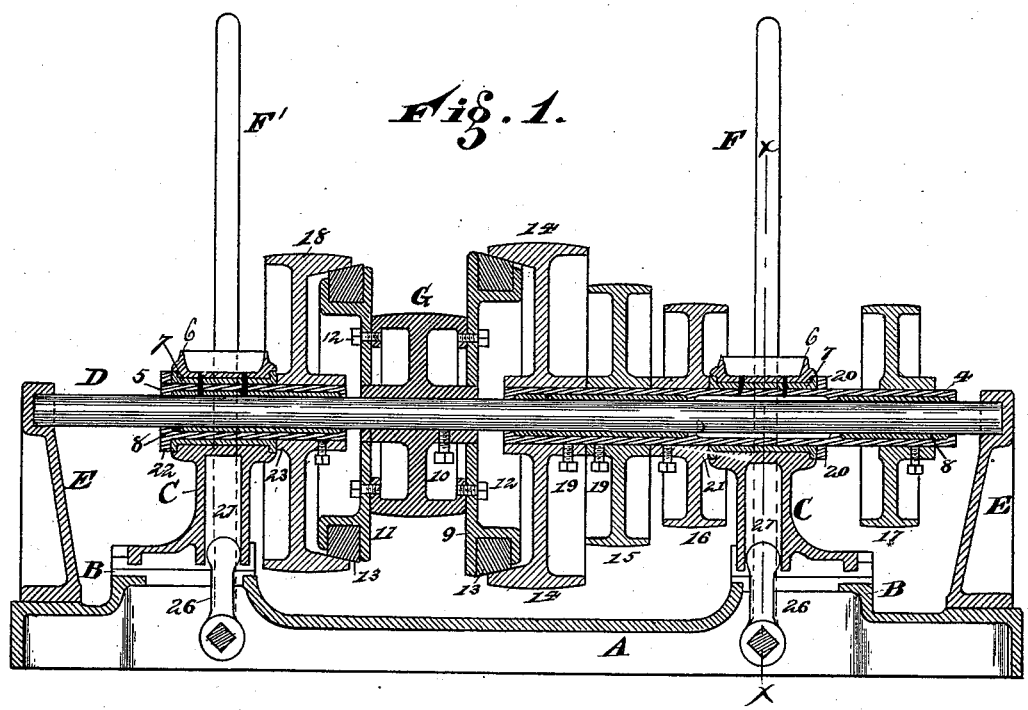
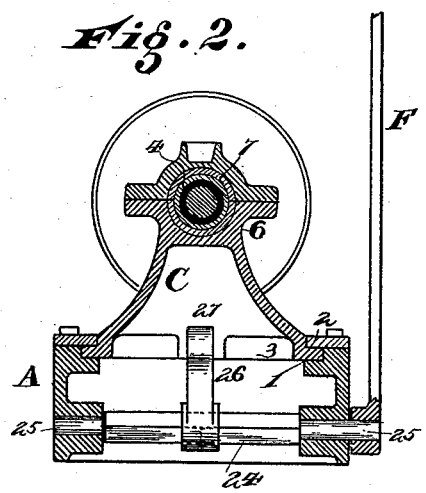
Attest
J. Watson Sims
M. E. Millican
Inventors.
George W. Bugbee
Frederick Danner
by Wood & Boyd
Their Attorneys

UNITED STATES PATENT OFFICE.

GEORGE W. BUGBEE AND FREDERICK DANNER, OF CINCINNATI, OHIO, ASSIGNORS TO THE EGAN COMPANY, OF SAME PLACE.

COUNTER-SHAFT.

SPECIFICATION forming part of Letters Patent No. 384,560, dated June 12, 1888.

Application filed February 9, 1888. Serial No. 263,445. (No model.)

*To all whom it may concern:*

Be it known that we, GEORGE W. BUGBEE and FREDERICK DANNER, residents of Cincinnati, in the county of Hamilton and State of Ohio, have invented certain new and useful Improvements in Counter-Shafts, of which the following is a specification.

Our invention has for its object the production of a continuous counter-shaft for a wood-worker running normally as an idler, in combination with the driving-pulleys journaling on the laterally-moving sleeve and operated by a lateral movement of the bearings, so as to readily connect or disconnect the driving-pulleys on the counter-shaft to start and stop the operation of the driven machine. The construction and arrangement of our machine are such that we have at once a cheap, strong, and durable device, the features of which will be set forth in the description of the accompanying drawings, making a part of this specification, in which—

Figure 1 is a central vertical longitudinal section of our invention. Fig. 2 is a section on line $x\ x$, Fig. 1.

We prefer to use our counter-shaft and driving mechanism constructed upon an independent bed-plate, and as such have shown it in the accompanying drawings; but we do not wish to limit the use to this specified form of mounting the counter-shaft and driving mechanism.

A represents a shell-shaped bed-plate.

B represents a ledge, in which are cut the grooves 1, which serve as ways for the adjustable pillar-blocks C.

2 represents gibs for holding the slides 3 of the pillar-blocks within the grooves 1.

D represents the counter-shaft. It is shown with its ends journaling in the brackets E. These are shown simply to prevent endwise movement of the shaft and to assist in journaling it. If driving-pulleys are not needed or used outside of the pillar-blocks C, other means might be employed to prevent end movement and these journals dispensed with. This shaft journals in the sleeves 4 and 5, and these sleeves in turn journal in the journal-boxes 6.

7 represents the babbitting of the sleeve-journals, and 8 the babbitting for the shaft in the sleeve 4 5.

G represents the driving-pulley for conveying motion to the shaft D. It is rigidly attached to said shaft by set-screw 10, or other suitable means.

9 11 represent friction-disks rigidly secured to said pulley by bolts 12, the peripheries of which disks are made of cone shape and faced with suitable material, 13, to form a surface suitable for a friction-clutch. These friction-cones are employed to convey motion to the driving-pulleys 14 15 16 17 18 in the following manner: sleeve 4 journals on the counter-shaft D, and the pulleys 14 15 16 17 are rigidly secured thereto, preferably by set-screws 19.

20 represents a collar on the sleeve 4, and the hub 21 on the pulley 16 acts as a similar collar on the opposite side of the bearing 7 and prevents the sleeve from moving endwise in its journal-box 6. 22 represents a similar collar on sleeve 5, and the hub 23 on the pulley 18 at the opposite side of the journal-box serves as a collar, preventing the sleeve 5 from moving endwise in its journal-box. Each journal-box is rigidly attached to or forms a part of its pillar C. These pillars being provided with slides 3 and moving on the bed of the shell, move these sleeves and the pulleys mounted thereon laterally. The pulley 14 is provided with a cone-face on the inner sides of its rim, engaging with one of the cone-clutches, and pulley 18 is provided with a similar frictional face engaging with the other cone-clutch. These two sleeves 4 5 are moved independently, so that either one or both may be in motion or out of motion, as desired, motion being conveyed to sleeve 4 by means of one of the cones clutching with pulley 14, and sleeve 5 being driven by the engagement of the pulley 18 with its cone 11.

In order that the pillar-blocks C and the sleeve and pulleys mounted thereon may be moved readily, we provide the following instrumentalities:

24 represents a shaft provided with gudgeons 25, which journal in bearings formed in the shell A, as shown in Fig. 2. One of said gudgeons projects through the shell and receives the hand-lever F, for rocking said shaft 24.

26 represents crank-arms, each mounted upon its shaft 24 and projecting up into the groove 27, formed in said pillar-block.

The movement of the lever F in either direction rocks the shaft 24, moves the crank-arm 26, which engages with its pillar-block C, moves it, and, through the collar attached to the sleeve, the sleeves also journal therein. By moving the lever F in one direction the pulley 14 is brought into engagement with the cone 9, and in the reverse direction the clutch is released. A similar movement of the opposite lever F' engages or releases the frictional connection of pulley 18 with its cone. The drawing Fig. 1 shows both cones in contact with the pulleys and in position for driving the mechanism. The pillar-blocks C are made with a lateral extension, so as to give a long firm bearing on the base to prevent vibration or lost motion. Any desired number of pulleys may be mounted on the sleeves 4 5, or any desired number of such frictional clutches and driving-pulleys may be employed.

Having described our invention, what we claim is—

1. The combination of the single continuous shaft D, the pulley G, fixed to the shaft and carrying a friction-cone, laterally-movable pillar-block C, the sleeve 4, mounted in the pillar-block, and the driving-pulley on the sleeve, substantially as described.

2. The combination of the counter-shaft D, the pulley G, carrying a friction-cone rigidly secured thereto, the laterally-moving pillar-block C, the sleeve 4, journaling within the said pillar-block C and provided with the collar 20, the crank-shaft 24, having the crank-arm 26 engaging with said pillar-block C, and the lever on the crank-shaft, substantially as described.

3. The combination of the bed-plate A, the counter-shaft D, the laterally-adjustable pillar-blocks C, the sleeves 4 5, journaled in said pillar-blocks C and adjustable therein, the driving-pulley G, having friction-cones 9 and 11, the friction-pulleys 14 and 18, mounted on the sleeves and moving laterally therewith, the lever and connections between the levers, and the pillar-blocks for moving said pillar-blocks, substantially as specified.

In testimony whereof we have hereunto set our hands.

GEORGE W. BUGBEE.
FREDERICK DANNER.

Witnesses:
ROBERT ZAHNER,
J. WATSON SIMS.